Patented Feb. 16, 1937

2,070,999

UNITED STATES PATENT OFFICE 2,070,999

CELLULOSE SOLUTION

Donald H. Powers, Moorestown, N. J., and Louis H. Bock, Bristol, Pa., assignors to Röhm & Haas Company, Philadelphia, Pa.

No Drawing. Application February 8, 1934, Serial No. 710,314

8 Claims. (Cl. 260—100)

This invention relates to improvements in the preparation of aqueous solutions or dispersions of cellulose. In particular it relates to solutions or dispersions of alpha cellulose or other slightly disintegrated cellulose which is not dissolved or at best is only swollen at ordinary or elevated temperatures by concentrated alkaline solutions.

This application is a continuation-in-part of our copending application Ser. No. 676,530 filed June 19, 1933, Patent No. 2,009,015 granted July 23, 1935.

It is an object of this invention to provide a method for the preparation of filterable solutions of cellulose which contain high percentage of cellulose and which do not deteriorate on storing nor on exposure to light. It is a further object to prepare such solutions at high temperatures. Other objects will appear hereinafter.

It has been known for some time that certain organic bases have a swelling action on alpha cellulose but in order to prepare filterable solutions of alpha cellulose the treatment required is much more drastic.

Lilienfeld (U. S. P. 1,771,462), dissolved cellulose in solutions of tetramethyl, tetraethyl and trimethylphenyl ammonium hydroxides, but in order to obtain complete solution, the cellulose had to be disintegrated to a certain degree or the temperature kept at room temperature or below. In case undisintegrated or slightly disintegrated cellulose were used, it would dissolve in solutions of these bases only at temperatures below 0° C. if at all.

We have found, however, that solutions of tetramethyl and tetraethyl ammonium hydroxides do not dissolve more than one or two percent of undisintegrated cellulose at room temperature or merely act as swelling agents in a manner similar to sodium or potassium hydroxide. The same is true if these materials are used at elevated temperatures.

We have now found that certain of the quaternary ammonium bases will dissolve cellulose at high temperatures and will yield clear, filterable solutions of high cellulose content. Such bases must, of course, be stable at the temperatures employed which may be as high as 150° C. For this purpose the quaternary ammonium bases of relatively high molecular weight are suitable and in particular those which contain at least one benzyl group or alkyl group having three or more carbon atoms. Such quaternary ammonium bases are unique in their action on cellulose because of the fact that they are able to dissolve undisintegrated cellulose at elevated temperatures and their solvent action is greater at higher temperatures. This effect is the opposite of that found by Lilienfeld because the bases described by him were more effective solvents at lower temperatures.

It is well known that when cellulose is disintegrated or degraded its mechanical strength is impaired. This applies also to the regenerated material in the form of sheets or fibers and hence it is advantageous to obtain a regenerated cellulose from a material which has been disintegrated or degraded as little as possible. The quaternary ammonium bases of this invention are all capable of dissolving alpha cellulose or very slightly degraded cellulose under the conditions given and the cellulosic material recovered from such solutions by dilution or acidification are superior in mechanical strength. Forms of cellulose which have been degraded least are alpha cellulose and sulfite wood pulp. These materials give the best results on regeneration and therefore it is decidedly advantageous to prepare highly concentrated solutions of these forms of cellulose.

Such solutions may be prepared by using a suitable quaternary ammonium base and treating the cellulose at comparatively high temperatures.

Among the quaternary ammonium hydroxides which we have found to be effective as cellulose solvents at high temperatures are the following:

Trimethylbenzyl ammonium hydroxide
Trimethylpropyl ammonium hydroxide
Trimethylbutyl ammonium hydroxide
Trimethylamyl ammonium hydroxide
Trimethylhexyl ammonium hydroxide
Trimethylheptyl ammonium hydroxide
Trimethylallyl ammonium hydroxide
Trimethyl (β-methylallyl ammonium hydroxide
Triethylbenzyl ammonium hydroxide
Dimethyldibenzyl ammonium hydroxide
Dimethylamylbenzyl ammonium hydroxide
Triamylmethyl ammonium hydroxide
Tributylmethyl ammonium hydroxide
Trimethyl β-phenylethyl) ammonium hydroxide
Dimethylphenylbenzyl ammonium hydroxide
Dimethyltolylbenzyl ammonium hydroxide
Diethylphenylbenzyl ammonium hydroxide.

The methyl groups in the above quaternary bases may be replaced by other alkyl groups such as the propyl, hexyl etc., and the benzyl groups by the alkylated or similar substituted benzyl groups. The resulting compounds will be effective solvents for cellulose at elevated temperatures.

These bases have a range of concentration in aqueous solution within which they are effective as solvents for cellulose and outside of which they cause gelatinization without forming filterable solutions. For example 2.6 normal trimethylpropyl ammonium hydroxide when heated with cotton linters for thirty minutes at 70° C. causes substantially complete dissolving of the linters and the solution may contain as much as 15% of cellulose. If, however, the concentration of this base is only 1.5 normal the fibres swell rapidly and finally gelatinize yielding a smooth, viscous and substantially clear paste. On filtration through a coarse medium such as spun glass, the filtrate contains little if any dissolved cellulose. Furthermore, if the solution of the trimethylpropyl ammonium hydroxide is about 3.2 normal the fibers will only gelatinize but will not dissolve. The other bases show similar properties but the exact range of normality for the different bases varies somewhat from the above figures.

In the case of some bases, such, for example, as trimethylbenzylammonium hydroxide, their solvent action definitely increases up to a certain normality, but increasing the normality of these bases beyond this point may not substantially decrease their solvent action.

While bases containing a phenyl group, such as the last four listed above, have a limited solvent action at temperatures up to 40-50° C. they are of little practical value due to their extreme instability on heating.

Solutions of undisintegrated or only slightly disintegrated cellulose containing as much as 18 to 20% of cellulose may be made by means of the aqueous solutions of the quaternary ammonium bases when the concentration of the latter lies within the proper range, viz. between about 25% and 50%. The temperatures employed in making such solutions lie between about 50 and 150° C. Only those bases can be used which are stable at these temperatures because if they decompose under the action of heat their solvent power is naturally lost.

Solutions made in accordance with the present invention may be diluted to any desired cellulose content by the addition of solutions of caustic, ammonia or the quaternary bases. For this purpose solutions containing four to eight percent of caustic or five to ten percent of ammonia or quaternary base are suitable. In diluting such solutions with caustic or ammonia the concentration of the quaternary ammonium base can be reduced to below the value required for the initial dissolving of the cellulose, without causing precipitation. This is of importance because of the fact that for making a solution containing say five to eight percent of cellulose, less of the expensive quaternary base is required than if the solution of cellulose were made up directly to that particular cellulose content. A solution of the quaternary ammonium base and caustic having the same concentration with respect to these materials as the diluted solution mentioned above would have only a gelatinizing or swelling effect on cellulose and would not dissolve it.

In the foregoing, reference has been made particularly to alpha cellulose or other slightly disintegrated cellulose. Since these are the most difficult to dissolve it is obvious that those types which are degraded to a greater extent will be dissolved more easily by solutions of the quaternary ammonium bases. The following kinds of cellulose are usually at least as easily dissolved as cotton linters:—

(1) Bleached sulfite or sulfate cellulose.
(2) Bleached cotton or cotton linters.
(3) Mechanical wood pulp.
(4) Cellulose oxidation products obtained from cellulose or cellulose containing bodies.
(5) Cellulose products obtained by treating cellulose containing materials with alkali of varying strengths with or without pressure.
(6) Regenerated cellulose such as viscose rayon, cuprammonium rayon, denitrated cellulose nitrate, or saponified cellulose acetate or formate. Any regenerated cellulose products precipitated from solution or dispersion in sulphuric acid, phosphoric acid, zinc chloride, calcium thiocyanate solutions, or the like.
(7) Cellulose esters or ethers.
(8) Any form of hydrated cellulose or hydrocellulose.

The solutions thus prepared may be used for the manufacture of sheets or fibers of cellulose by passing the solution through a suitable orifice into a strongly acid, neutral or alkaline solution. They may also be used for coating other fabrics with a layer of cellulose and in this instance the adhesion between the deposited cellulose and the underlying fabric is unusually strong because of the solvent or swelling action of the solution on the cellulose of the fabric.

The invention may be practiced according to the following examples:—

1. One hundred fifty parts of cotton linters were stirred into 850 parts of 2.3 normal aqueous trimethylbenzylammonium hydroxide. This paste was worked in a Werner and Pfleiderer mixer. Steam was run into the jacket of the mixer until the temperature of the paste was approximately 70° C. The mix was worked for one hour at this temperature and formed a smooth, viscous paste. Mixing is continued until the cellulose is entirely dissolved. Then an equal volume of one normal sodium hydroxide solution was slowly added to the paste, lowering the viscosity considerably. This diluted material, on acidification, or dilution with water gives a heavy precipitate of cellulose. It may be precipitated in acid to form sheets or run thru an orifice to form synthetic fibers.

2. Ten parts of purified sulfite cellulose are mixed with 90 parts of 2.8 normal aqueous trimethylamylammonium hydroxide. The mixture was warmed in a jacketed kettle to 75° C. and gently stirred. At the end of an hour a viscous paste was obtained, free from lumps and undissolved cellulose. This paste may be used for coatings or diluted with normal sodium hydroxide solution to give less concentrated solutions.

3. Thirty parts of rayon waste were mixed with 200 parts of 2.0 normal aqueous dimethyl-dibenzyl ammonium hydroxide. The mixture was warmed in a jacketed kettle to 80° C. and stirred until a smooth viscous paste was obtained. Heavy cotton duck was coated with this paste and run immediately into acid, dried and calendered. The resulting fabric had a very high luster and retained its original flexibility.

4. Sixteen parts of ground purified wood pulp were mixed with 90 parts of 2.2 normal aqueous trimethylbenzylammonium hydroxide. The mixture was vigorously and rapidly heated to a temperature of 140° C., held at this temperature for 10 minutes and rapidly cooled. The smooth solution resulting was diluted at 70 to 75° C. with 6% sodium hydroxide to a cellulose content of 4%.

5. Six parts of cotton linters were stirred into 85 parts of 2.0 normal aqueous tributylmethyl ammonium hydroxide at 50° C. The mixture was allowed to stand for several hours and stirred for 30 minutes. The resulting paste was precipitated in the form of fibers by forcing thru fine orifices into strong solution of sulfuric acid.

The foregoing examples are given by way of illustration only and are not intended to limit the invention as to concentrations, materials or other conditions since the invention may be otherwise practiced within the scope of the following claims.

We claim:

1. The process of preparing cellulose solutions which comprises treating a cellulosic body with an aqueous solution of a quaternary ammonium hydroxide of the general formula

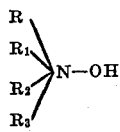

in which R, R₁ and R₂ represent alkyl hydrocarbon groups and R₃ represents an aralkyl radical or an alkyl hydrocarbon group containing at least three carbon atoms.

2. The process of preparing cellulose solutions which comprises treating undisintegrated cellulose with an aqueous solution of a quaternary ammonium hydroxide of the general formula

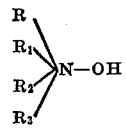

in which R, R₁ and R₂ represent alkyl hydrocarbon groups and R₃ represents an aralkyl radical or an alkyl hydrocarbon group containing at least three carbon atoms.

3. The process of preparing cellulose solutions which comprises treating a cellulosic body with an aqueous solution of a quaternary ammonium hydroxide of the general formula

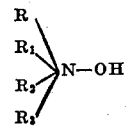

in which R, R₁ and R₂ represent alkyl hydrocarbon groups and R₃ represents an aralkyl radical or an alkyl hydrocarbon group containing at least three carbon atoms and thereafter diluting the solution with a four to eight percent solution of an alkali metal hydroxide.

4. The process of preparing cellulose solutions which comprises treating undisintegrated cellulose with an aqueous solution of a quaternary ammonium hydroxide of the general formula

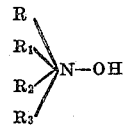

in which R, R₁ and R₂ represent alkyl hydrocarbon groups and R₃ represents an aralkyl radical or an alkyl hydrocarbon group containing at least three carbon atoms and thereafter diluting the solution with a four to eight percent solution of an alkali metal hydroxide.

5. A solution containing cellulose and a quaternary ammonium hydroxide of the general formula

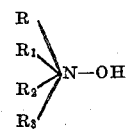

in which R, R₁ and R₂ represent alkyl hydrocarbon groups and R₃ represents an aralkyl radical or an alkyl hydrocarbon group containing at least three carbon atoms.

6. A solution containing undisintegrated cellulose and a quaternary ammonium hydroxide of the general formula

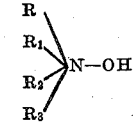

in which R, R₁ and R₂ represent alkyl hydrocarbon groups and R₃ represents an aralkyl radical or an alkyl hydrocarbon group containing at least three carbon atoms.

7. The process of preparing cellulose solutions which comprises treating a cellulosic body with an aqueous solution of a quaternary ammonium hydroxide of the general formula

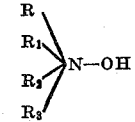

in which R, R₁ and R₂ represent alkyl hydrocarbon groups and R₃ represents an alkyl hydrocarbon group containing at least three carbon atoms.

8. The process of preparing cellulose solutions which comprises treating undisintegrated cellulose with an aqueous solution of trimethylpropyl ammonium hydroxide.

DONALD H. POWERS.
LOUIS H. BOCK.